United States Patent
Stonehocker et al.

(10) Patent No.: US 11,393,463 B2
(45) Date of Patent: Jul. 19, 2022

(54) SYSTEM AND METHOD FOR CONTROLLING AN APPLICATION USING NATURAL LANGUAGE COMMUNICATION

(71) Applicant: SoundHound, Inc., Santa Clara, CA (US)

(72) Inventors: Timothy P. Stonehocker, Sunnyvale, CA (US); Kathleen Worthington McMahon, Woodside, CA (US)

(73) Assignee: SoundHound, Inc., Santa Clara, CA (US)

(*) Notice: Subject to any disclaimer, the term of this patent is extended or adjusted under 35 U.S.C. 154(b) by 440 days.

(21) Appl. No.: 16/388,867

(22) Filed: Apr. 19, 2019

(65) Prior Publication Data
US 2020/0335101 A1   Oct. 22, 2020

(51) Int. Cl.
*G10L 15/22* (2006.01)
*G10L 15/06* (2013.01)
*G10L 15/193* (2013.01)
*G06F 3/16* (2006.01)

(52) U.S. Cl.
CPC ............... *G10L 15/22* (2013.01); *G06F 3/167* (2013.01); *G10L 15/063* (2013.01); *G10L 15/193* (2013.01); *G10L 2015/0633* (2013.01); *G10L 2015/223* (2013.01)

(58) Field of Classification Search
CPC ....... G10L 15/22; G10L 15/193; G10L 15/30; G06F 3/167
See application file for complete search history.

(56) References Cited

U.S. PATENT DOCUMENTS

| | | | |
|---|---|---|---|
| 7,024,366 B1* | 4/2006 | Deyoe | G10L 15/22 704/246 |
| 9,378,740 B1* | 6/2016 | Rosen | G10L 15/1822 |
| 9,443,527 B1 | 9/2016 | Watanabe et al. | |
| 9,769,314 B2* | 9/2017 | Kurganov | G10L 15/22 |
| 10,021,765 B1* | 7/2018 | Elliot | H04L 67/025 |
| 2003/0004728 A1* | 1/2003 | Keiller | G06F 3/16 704/275 |
| 2003/0093281 A1* | 5/2003 | Geilhufe | G10L 13/00 704/275 |
| 2004/0205549 A1* | 10/2004 | Yassin | G06F 40/16 715/236 |
| 2004/0225504 A1* | 11/2004 | Junqua | G06F 3/16 704/275 |
| 2006/0015878 A1* | 1/2006 | Ritter | G06F 3/0489 719/310 |

(Continued)

FOREIGN PATENT DOCUMENTS

| | | | | |
|---|---|---|---|---|
| WO | WO-2017219519 A1 * | 12/2017 | | G10L 15/28 |
| WO | WO-2017219653 A1 * | 12/2017 | | G10L 15/26 |

*Primary Examiner* — Daniel C Washburn
*Assistant Examiner* — Oluwadamilola M Ogunbiyi
(74) *Attorney, Agent, or Firm* — Dana Legal Services; Jubin Dana (57) ABSTRACT

A system and method are disclosed for setting up a communication link between a device or application and a system with a controller. The controller can collect and send information to the application. A user interfaces with the controller to access the functionality of the application through providing commands to the controller. The system allows the user to interface with multiple applications.

15 Claims, 11 Drawing Sheets

(56) References Cited

U.S. PATENT DOCUMENTS

| | | | | |
|---|---|---|---|---|
| 2006/0111909 A1* | 5/2006 | Maes | ............... | H04L 41/00 |
| | | | | 704/270 |
| 2013/0181089 A1* | 7/2013 | Recksiek | ............... | B64C 9/16 |
| | | | | 244/99.3 |
| 2014/0278419 A1* | 9/2014 | Bishop | ............... | G06F 3/167 |
| | | | | 704/249 |
| 2015/0120297 A1* | 4/2015 | Meruva | ............... | G10L 15/19 |
| | | | | 704/243 |
| 2015/0170664 A1* | 6/2015 | Doherty | ............... | G08C 17/02 |
| | | | | 704/275 |
| 2016/0161946 A1* | 6/2016 | Wuth Sepulveda | . | G05D 1/0022 |
| | | | | 701/2 |
| 2016/0359805 A1* | 12/2016 | Spraggs | ............... | G06F 8/60 |
| 2017/0012821 A1* | 1/2017 | Sa | ............... | H04W 4/80 |
| 2017/0076721 A1* | 3/2017 | Bargetzi | ............... | G10L 15/30 |
| 2018/0018990 A1* | 1/2018 | Kim | ............... | G10L 19/0017 |
| 2018/0040319 A1* | 2/2018 | Rotman | ............... | G04G 13/026 |
| 2018/0108365 A1* | 4/2018 | Seemiller | ............... | G06F 16/433 |
| 2018/0217810 A1* | 8/2018 | Agrawal | ............... | G06F 3/0482 |
| 2019/0065479 A1* | 2/2019 | Wu | ............... | G06F 40/58 |
| 2019/0206388 A1* | 7/2019 | Aggarwal | ............... | G10L 15/22 |
| 2019/0279615 A1* | 9/2019 | Ben-Dor | ............... | G10L 13/00 |
| 2019/0303050 A1* | 10/2019 | Itogawa | ............... | H04N 1/2307 |
| 2019/0303438 A1* | 10/2019 | Wilson | ............... | G10L 15/1815 |
| 2019/0324925 A1* | 10/2019 | Toyoda | ............... | G06F 16/3329 |
| 2020/0073629 A1* | 3/2020 | Lee | ............... | G06F 3/04817 |
| 2020/0184530 A1* | 6/2020 | Anderson | ............... | A23G 9/322 |
| 2021/0367977 A1* | 11/2021 | Beckman | ............... | H04L 63/20 |

* cited by examiner

SYSTEM AND METHOD FOR CONTROLLING AN APPLICATION USING NATURAL LANGUAGE COMMUNICATION

FIELD OF THE INVENTION

The present invention is in the field of control systems with speech recognition capability, and more specifically, to system that establish a communication link with an application to allow a user to interface with and control the application.

BACKGROUND

Many devices have specific control commands. These control commands are programmed into the device. When these commands are provided to the device, then the device performs a task or function per the control command. However, many devices that use control commands lack the ability to connect to a central controller that a user uses to provide natural language commands for the device. This is especially evident when a user acquires a new device and needs to spend time setting up the device. Therefore, what is needed is a system and method for allowing a device to communicate with a central controller and receive information from the central controller.

SUMMARY OF THE INVENTION

Systems and methods are provided for setting up a communication link between a device or application and a system with a controller. The controller can collect and send information to the application. According to an embodiment of the invention, the system and method disclosed herein allow for identification information. Furthermore, the application can be augmented with additional grammar rules from the controller An embodiment of the system includes a system that includes Automatic Speech Recognition (ASR) that performs speech recognition and converts speech-to-text. The system captures speech audio, performs speech recognition on the segment of speech audio, performs natural language understanding of the spoken words, and compares the words to grammar rules. The system, through a controller, communicates with an application.

There are various advantages of the invention. One advantage of the invention is a seamless integration of an application with a system having a controller with which the user is already familiar. Another advantage of the invention is the ability to define grammar rules that expand the functionality of an application, after the application is built or deployed for use by a user. Another advantage is the ability to add to a library of grammar rules and resulting functionality for the application. A further advantage of the intention includes the ability to interface with an application, through the system having the controller, using a variety of input means, such as a speecrophone for speech recognition, a biometric input means, a facial recognition input means, a touch screen, or a keyboard.

DETAILED DESCRIPTION

All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," or similar language means that a particular aspect, feature, structure, or characteristic described in connection with the embodiment is included in at least one embodiment. Thus, appearances of the phrases "in one embodiment," "in at least one embodiment," "in an embodiment," "in certain embodiments," and similar language throughout this specification may, but do not necessarily, all refer to the same embodiment or similar embodiments.

Embodiments of the invention described herein are merely exemplary, and should not be construed as limiting of the scope or spirit of the invention as it could be appreciated by those of ordinary skill in the art. The disclosed invention is effectively made or used in any embodiment that comprises any novel aspect described herein. All statements herein reciting principles, aspects, and embodiments of the invention are intended to encompass both structural and functional equivalents thereof. It is intended that such equivalents include both currently known equivalents and equivalents developed in the future.

Furthermore, to the extent that the terms "including", "includes", "having", "has", "with", or variants thereof are used in either the detailed description and the claims, such terms are intended to be inclusive in a similar manner to the term "comprising".

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" have an effectual relationship realizable by a direct connection or indirect connection, which uses one or more other intervening elements. Elements described herein as "communicating" or "in communication with" other elements include any form of communication or link. For example, a communication link may be established using 802.11 wireless protocols, near-filed protocols, or RFID.

As used herein the term "application" or "app" includes anything that an end-user purchases and deploys or uses in their home or workplace. An application includes anything that incorporates the ability to communicate, by receiving and sending information, with other applications. An application may be a device, which is an object that can establish a communication link or connection with another system or device. An application may also be an object that is coupled with a device. In accordance with an embodiment, applications include an identification or ID. Examples of different types of ID includes a bar code or a set of numbers or anything that can uniquely identify and distinguish either the specific embodiment of the application or its type from other applications.

In accordance with various embodiments of the invention, some applications include the ability to store grammar or grammar rules. As used herein "grammar" includes a set of one or more phrasing rules, which may be related to a domain of conversation. Each rule defines a phrasing that indicates or represents a particular meaning and may result in a task being performed by the application. The phrasing is typically in natural language and spoken by a user. The grammar or grammar rule includes functional information that an application recognizes and acts as control information that the application uses to perform a task or action. The grammar rule includes information for managing the application. The grammar also includes information for execution by the application, the execution of which results in a response from the application. In accordance with another embodiment, a grammar is stored in a remote location and accessed as needed. For example, a grammar rule may support the phrasing "what's the weather," which is natural language, and the grammar rule causes a request to look up the weather report. A grammar "what's the weather in <PLACE NAME>" is a grammar rule that means a request to look up the weather report for whatever PLACE NAME a speaker utters.

In accordance with an embodiment of the invention, a grammar describes phrasings of utterance or captured speech that are made up of words. As used herein, a "word" is defined relative to any spoken language and can be represented in written form using characters or letter based on any writing system, including an alphabetical writing system. For example, an English spoken word may be represented using an alphabetical writing system. In accordance with another embodiment of the invention, a Chinese spoken word may be represented by Chinese characters. In accordance with another embodiment of the invention, the word may be spoken in Arabic and the Arabic sounds are represented by alphabetical letters. Any combination of spoken words and visual representation of the spoken word may be used.

Figure 1:
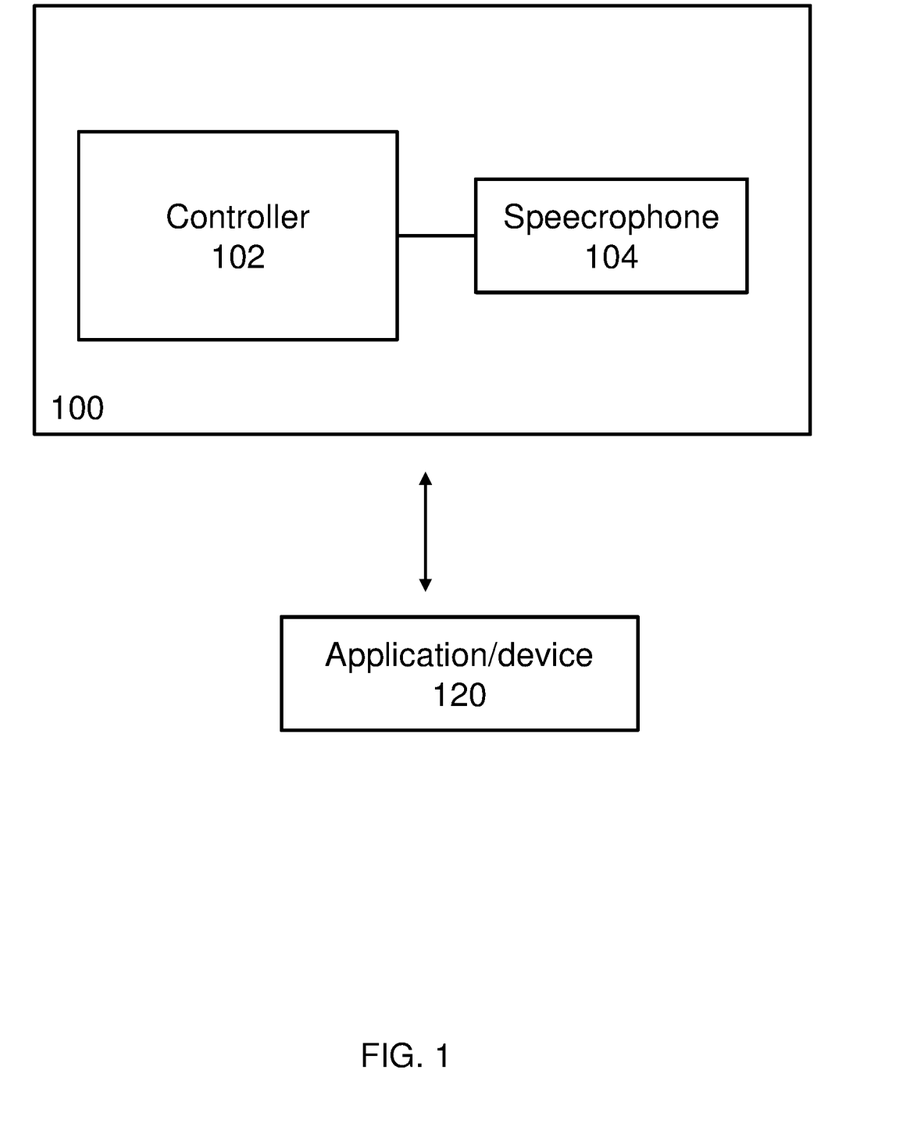
FIG. 1 shows a system for controlling an application using natural language according to an embodiment of the invention.

Referring now to FIG. 1, a system 100 is shown in accordance with an embodiment of the invention. The system 100 includes a controller 102 and a speecrophone 104. The speecrophone 104 includes a speaker for generating sound waves and a microphone for capturing sound waves. The speecrophone 104 acts as an interface for a user when communicating or speaking to the system 100 using natural language. The speecrophone 104 also receives verbal information from the system 100. The system 100 is in communication with a device or an application 120. The communication link between the system 100 and the application 120 is a dynamic connection. In accordance with one embodiment, the application 120 transfers grammar or grammar rules to the controller 102. Any speech captured at the speecrophone 104 is sent to the controller 102. The system 100 converts the speech and compares it to the grammar received from the application 120 to determine what control information or functional instruction to provide to the application 120.

The application 120 also include an identity or ID. In accordance with one embodiment of the invention, the application 120 sends its ID to the controller 102. In accordance with one embodiment of the invention, when the controller 102 has the ID of the application 120, then the controller 102 can access and retrieve the grammar for the application 120 from a remote location over a network, such as the internet or an intranet/closed network.

When the controller 102 has the ID of the application 120, then the controller 102 uses the ID to determine when commands received and detected at the speecrophone 104 are intended for the application 120, especially when the controller 102 is in communication with multiple applications.

In accordance with one embodiment of the invention, when the speecrophone 104 detects or captures spoken words and sends the captured information, such as the spoken words, to the controller. In accordance with one aspect of the invention, the controller 102 responds to uses by synthesizing speech using text-to-speech (TTS). The controller 102 can use ASR in any language. In accordance with one embodiment of the invention, the user selects the specific language. For example, if the ASR is set to receive and synthesize the received speech in English, then it assumes that the incoming words or speech is in English. In accordance with another embodiment of the invention, the ASR is pre-selected at the time the controller 102 is manufactured. The controller 102 analyzes the captured spoken words. The controller 102 discards anaphora words, which are repetitive or at the beginning not relevant to the command, such as the word "please" or similar word or phrase.

In accordance with one embodiment of the invention, the application 120 provides Application Programming Interface (API) functionality and transfers grammar to the controller 102.

In accordance with one embodiment of the invention, the application 120 provides API functionality. The controller 102 is in communication with the application 120. The application 120 transfers a functionality declaration to the controller 102. The controller 102 can understand and process natural language information from a user.

Using the speecrophone 104, the user can provide information and input to the application 120 through the controller 102. In accordance with one embodiment of the invention, the system 100 includes machine learning capabilities. Thus, the system is further trained using dialogue based learning and training using machine learning. In this way, the system 100 can be trained to adapt the grammar rules, including the functions, of the appliance 120 to the user's dialogue nuances that may not exactly match the grammar rules of the application 120. Thus, the system 100 bridges the gap between what the application 120 has defined as the grammar rules and functionality to what is actually spoken by the user. The details of what is intended by the user can be used to determine and select a grammar rule appropriate for the intended function. Thus, the intelligence developed by the system 100, using machine learning, about the user can be seamlessly adapted to any application and any grammar rules.

Figure 2:
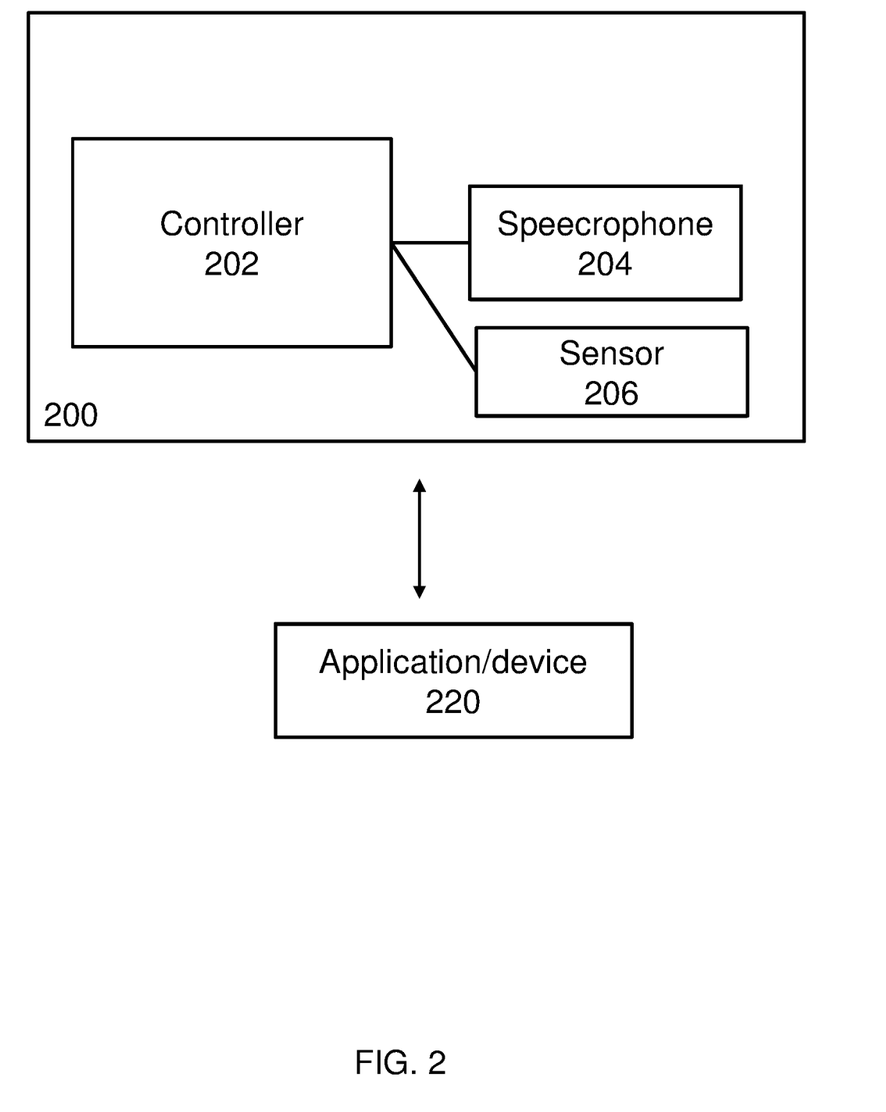
FIG. 2 shows a system for controlling an application using natural language according to an embodiment of the invention.

Referring now to FIG. 2, a system 200 is shown in accordance with an embodiment of the invention. The system 200 includes a controller 202, a speecrophone 204, and a sensor 206. The speecrophone 204 includes a speaker for generating sound waves and a microphone for capturing sound waves, which are at least sounds from a user. The speecrophone acts as an interface for a user to speak into and receive verbal information. The system 200 is in communication with an application or device 220.

The sensor 206 allows the system 200 to detect the location of application 220 and provides positional sensing. For example, based on the signal strength of the communication link, the sensor 206 provides information to the controller 202 about the location of the application 220. In accordance with one embodiment of the invention, remote sensors can be positioned throughout a space and in communication with the system 200 to allow for triangulation to better determine the location of the application. In accordance with one embodiment of the invention, when any sensor detects the presence of an application, then the system 200 is alerted and automatically can pair the system 200 with the application 220.

As noted with respect of FIG. 1, the controller 202 and application 220 can be arranged in any number of ways, in accordance with various embodiments, including having: the manufacturer set up the application with all the grammar and that grammar is transferred to the controller once a communication link is established between the application and the controller; the controller using ASR to determine and program functionality and grammar for the application; the application high-level grammar and including API interface that allows for programming of the application by the controller or a user providing commands to the controller; and the application including an API and the controller providing grammar updating or programming the application, after a communication link is established, with the grammar. For example, an application may be a printer. The printer establishes a communication link with a system that includes a controller. A user can then provide commands to the printer, through the controller. Additionally, the printer provides specific grammar to the controller that includes the various functions the printer performs according to the grammar provided from the printer to the controller.

In accordance with one embodiment of the invention, the sensor 206 can determine proximity of the user to the system 200 (or controller 102). For example, the direction and location of the user's voice or the volume of the user's voice.

Thus, the system 200 can select specific functionality or grammar rules based on the user's past behavior, given the user's proximity and location as well as environmental factors and conditions, such as time of day or temperature.

Figure 3:
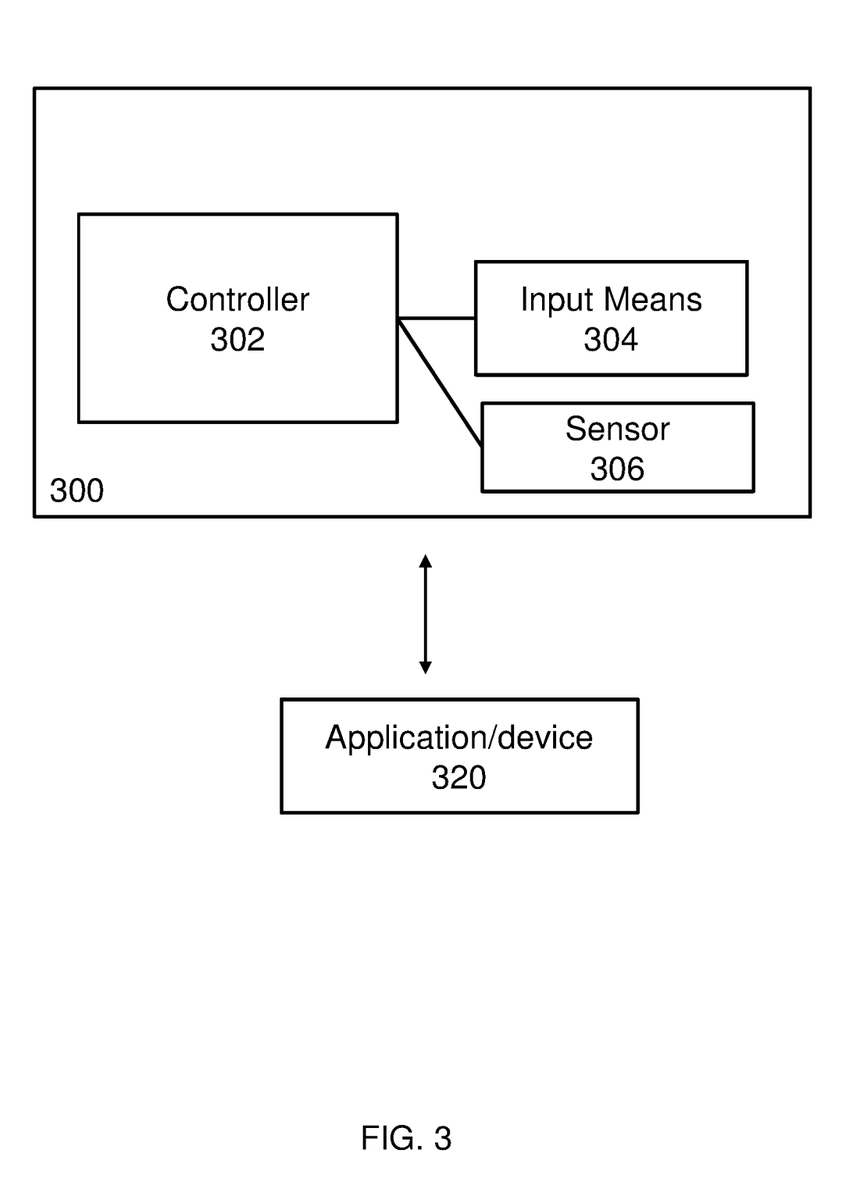
FIG. 3 shows a system for controlling an application using natural language according to an embodiment of the invention.

Referring now to FIG. 3, a system 300 is shown in accordance with an embodiment of the invention. The system 300 includes a controller 302, an input means 304, and a sensor 306. The input means 304 includes any means for providing an input to the controller. For example, the input means may be a keyboard, a touch screen, a video camera, or biometric input means. The system 300 is in communication with a device or an application 320. In accordance with one embodiment, the application 320 transfers grammar or grammar rules to the controller 302. The application 320 also has an identity or ID. In accordance with one embodiment, the application 320 sends its ID to the controller 302. The controller 302 uses the ID to determine when a grammar, which includes commands, received and detected at the input means 304 is intended for controlling the application 320, especially when the controller 302 is in communication with multiple applications, each having a different ID. In accordance with an embodiment of the invention, when multiple application or multiple systems controlling multiple application are networked, then information can be shared, with high degree of confidentiality, among the network system and/or application. In this way, information can be collected and coordinated using crowd sourcing. As noted with respect to FIG. 1 and FIG. 2, similar features and functions may be performed by the system 300 and the controller 302 and the application 320, which is in accordance with the various embodiments of the invention.

Figure 4:
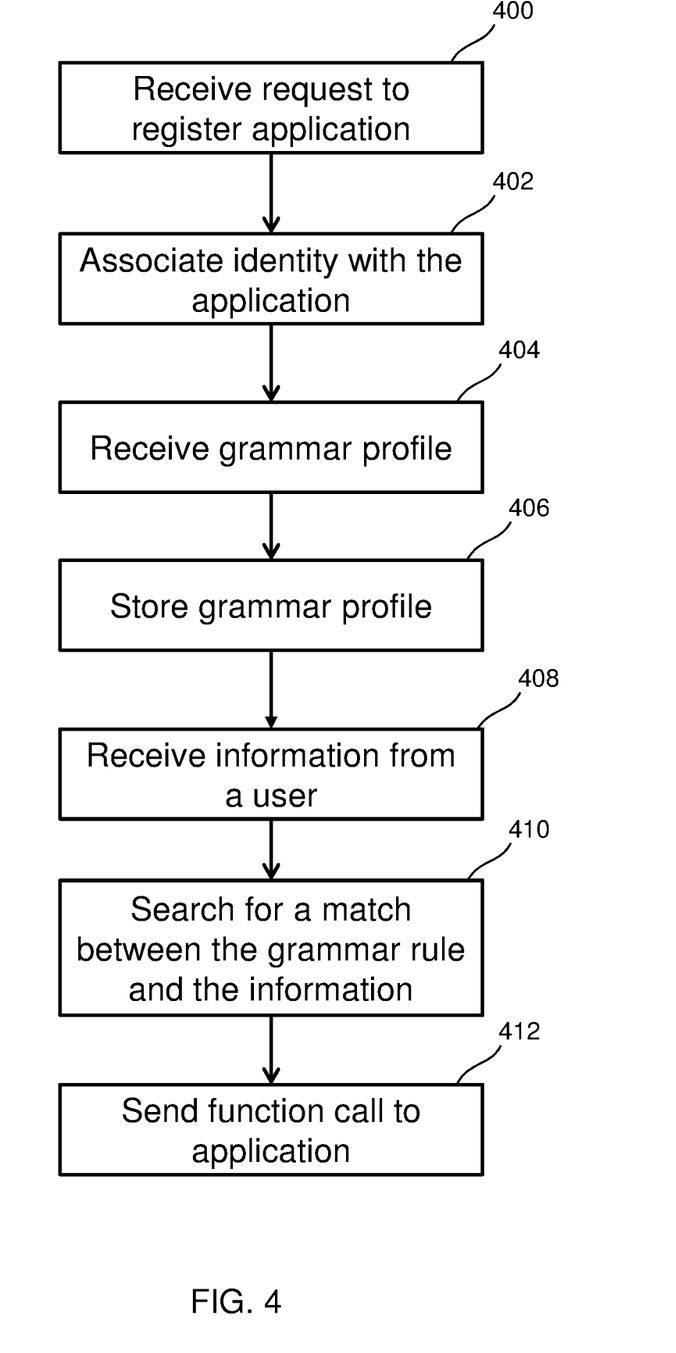
FIG. 4 shows a process for registering an application to establish a communication link in accordance with an embodiment of the invention.

Referring now to FIG. 4, a process is shown for establishing a communication link between an application and a system including a controller. At step 400, the controller receives a request to register an application as the application sends the application identity (ID) to the controller. At step 402, the controller associates the ID with the application. At step 404, the controller receives, from the application, the grammar rules as part of the application's grammar profile. At step 406, the system stores the grammar rules and grammar profile in memory. At step 408, the system receives information from a user. The information can be in any form, including natural language speech, input from a keyboard, visual information captured by a camera. The system converts the information from the user to data format. At step 410, the system searches the grammar rules to find a match between the user information and a grammar rule. At step 412, the system send a function call to the application. The application receives the function call and invokes the function associated with it.

Figure 5:
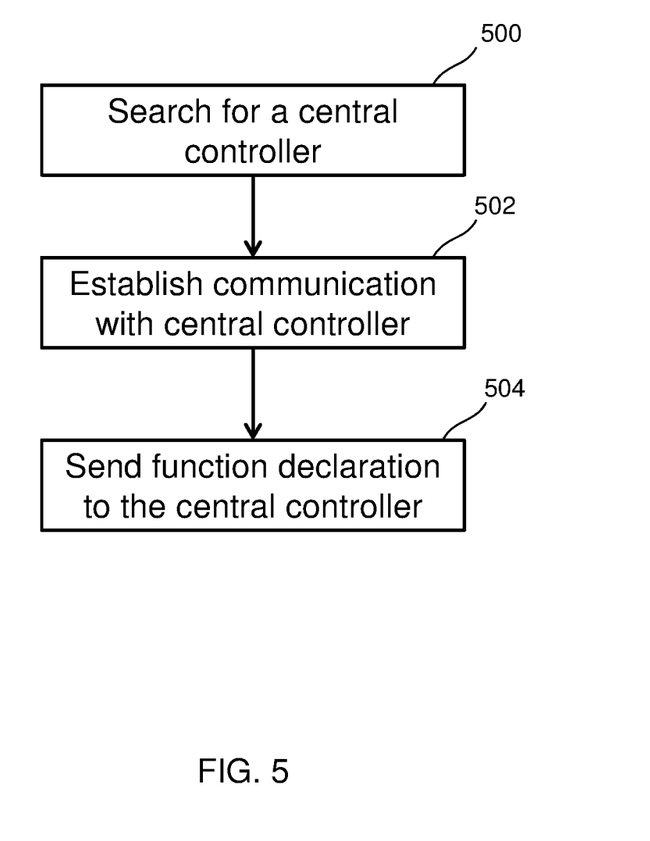
FIG. 5 shows a process for establishing communication with and sending functional declaration to a central controller in accordance with an embodiment of the invention.

Referring now to FIG. 5, a process is shown for establishing communication with a central controller. At step 500, an application searches for a central controller. At step 502, the application established communication with the central controller. In accordance with one aspect of the invention, the application sends its ID and grammar rule to the central controller to establish the communication. In accordance with one aspect, the invention, the application sends its ID to the central controller to establish communication. In accordance with one aspect of the invention, the application sends grammar rules to the central controller to establish communication. At step 504, the application specific function declaration is sent to the central controller. In accordance with one aspect of the invention, the functional declaration, which is for the application, is sent from a remote location to the central controller. In accordance with one aspect of the invention, the functional declaration is sent from the application to the central controller.

Figure 6:
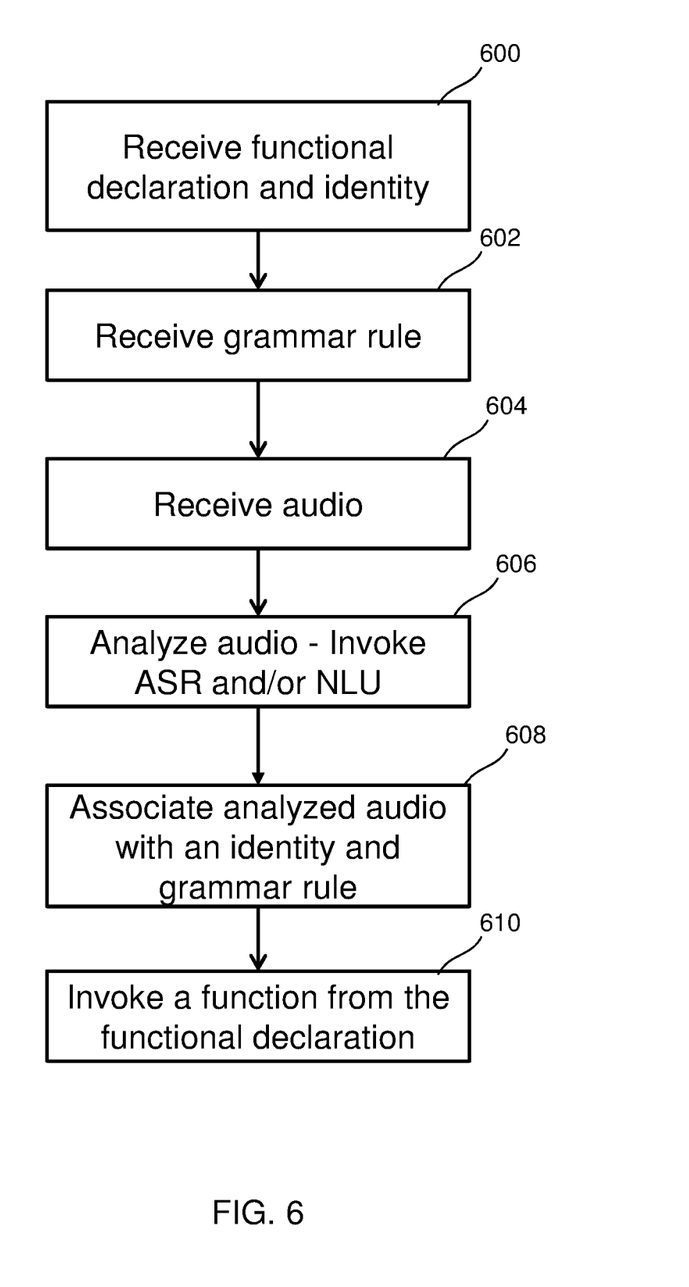
FIG. 6 shows a process for analyzing audio to invoke an application's function in accordance with an embodiment of the invention.

Referring now to FIG. 6, a process for analyzing audio received at a system, which includes a controller and a speecrophone, is shown. At step 600, a controller receives functional declaration, from an application or a remote source, and identity (ID) information from the application. At step 602, the controller receives grammar rules. In accordance with one aspect of the invention, the grammar rules are sent from the application to the controller. In accordance with one aspect of the invention, the grammar rules are sent from a remote location to the controller based on the ID of the application that the controller provides to the remote location. In accordance with one aspect of the invention, the grammar rules are updated and provided to the application. In accordance with one aspect of the invention, the grammar rules are programmed in the application through an API. At step 604, the speecrophone captures audio and the controller receives the audio. At step 606, the audio is analyzed by the system using ASR and natural language understanding (NLU). At step 608, the system compares the analyzed audio to determine the application that is associated with the grammar rule and the ID. At step 610, the grammar rule is communicated to the application to invoke a function from the functional declaration for the application.

Figure 7:
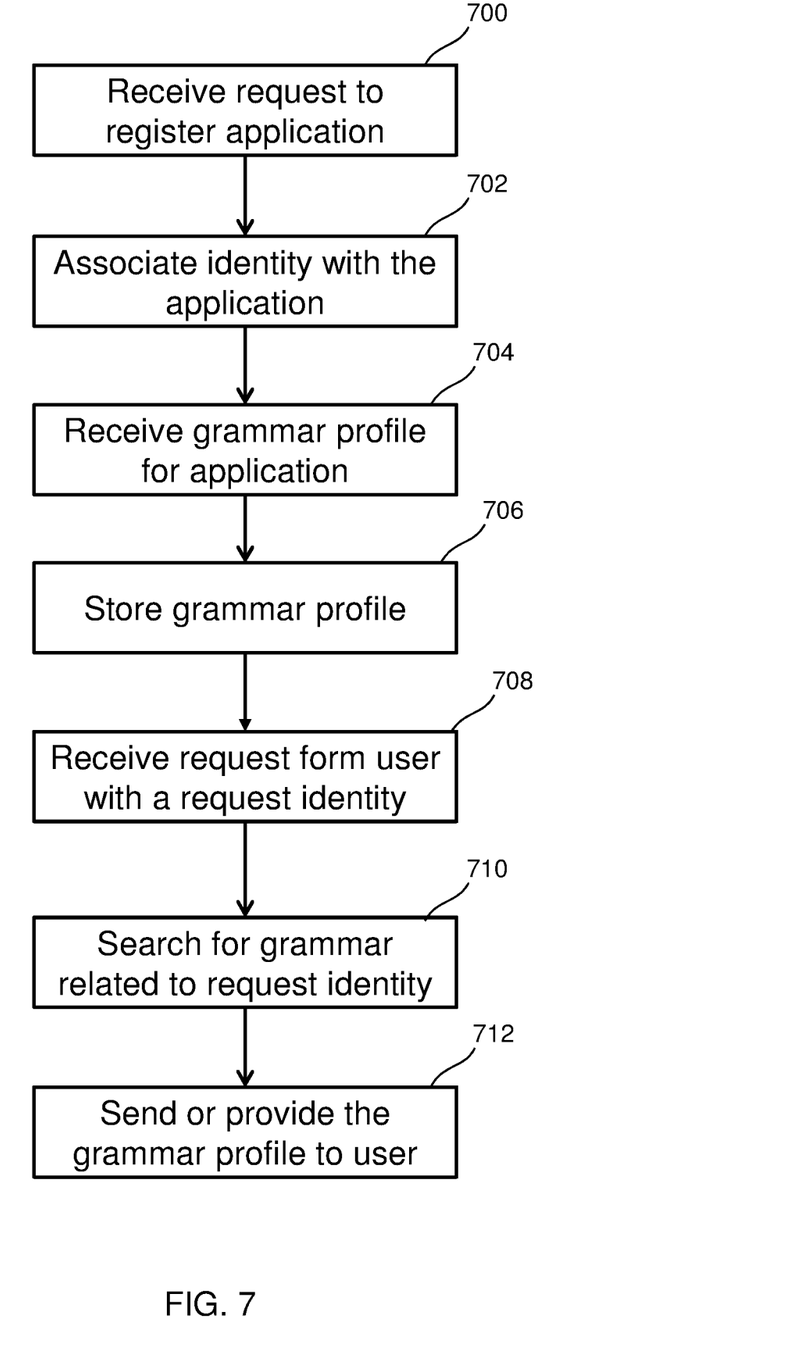
FIG. 7 shows a process for providing an application's grammar rules to a user in accordance with an embodiment of the invention.

Referring now to FIG. 7, a process for providing an application grammar rules to a user is shown. At step 700, a request to register an application with a system, which includes a controller and an input means, is received at the controller. At step 702, the controller associates the identity (ID) received with the application that sent the ID. At step 704, the controller receives the grammar profile or grammar rule for the application. In accordance with one embodiment of the invention, the grammar rule is received from the application. In accordance with one embodiment of the invention, the grammar rule is received from a remote location or server or system. At step 706, the system stores the grammar profile for the application. At step 708, the system receives a request from a user with a request identity. The request identity is captured or received through the input means. In accordance with one embodiment of the invention, the input means is a speecrophone. In accordance with one embodiment of the invention, the input means is a keyboard. In accordance with one embodiment of the invention, the input means is a camera. At step 710, the controller searches the memory of the system for a grammar profile related to the request identity. If a match is found, then the system provides the grammar profile to the user using an output means. Various output means are contemplated in the various embodiments of the invention.

In accordance with one embodiment of the invention, the grammar rules or grammar profile are established when the device is manufactured. In accordance with one embodiment of the invention, the grammar rules are augmented using the controller and an API interface as outline herein.

Figure 8:
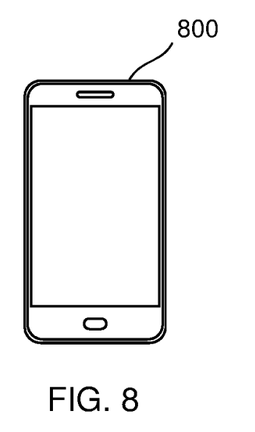
FIG. 8 shows an application that is a mobile communication device in accordance with an embodiment of the invention.
Figure 9:
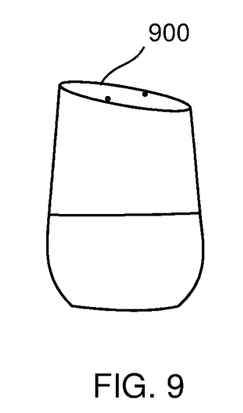
FIG. 9 shows an application that is a personal home device in accordance with an embodiment of the invention.
Figure 10:
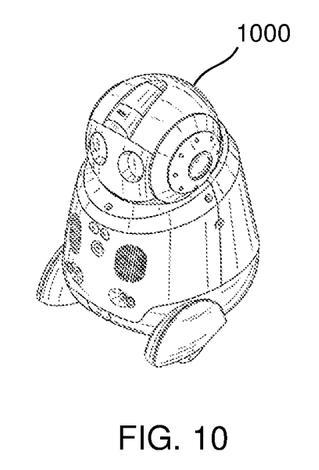
FIG. 10 shows an application that is an electronic butler in accordance with an embodiment of the invention.

Some embodiments are screenless, such as an earpiece, which has no display screen. Some embodiments are stationary, such as a vending machine. Some embodiments are portable, such as a mobile phone 800 as shown in FIG. 8. Some embodiments comprise manual interfaces such as keyboard or touch screens. Some embodiments comprise neural interfaces that use human thoughts as a form of natural language expression. Some embodiments are a home personal assistant device 900 as shown in FIG. 9. Some embodiments are a personal electronic butler 1000 as shown in FIG. 10.

Figure 11A:
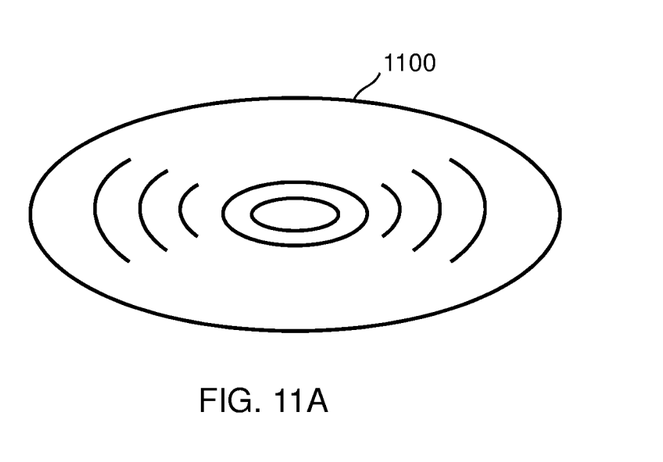
FIG. 11A shows a rotating disk non-transitory computer readable medium according to an embodiment of the invention.

Referring now to FIG. 11A, a non-transitory computer readable medium 1100 that is a rotating magnetic disk is shown. Data centers commonly use magnetic disks to store code and data for servers. The non-transitory computer readable medium 1100 stores code that, if executed by one or more computers, would cause the computer to perform steps of methods described herein. Rotating optical disks and other mechanically moving storage media are possible.

Figure 11B:
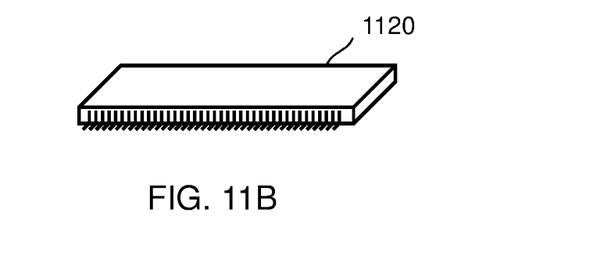
FIG. 11B shows Flash RAM chip non-transitory computer readable medium according to an embodiment of the invention.

Referring now to FIG. 11B, an example non-transitory computer readable medium 1120 that is a Flash random access memory (RAM) chip is shown. Data centers commonly use Flash memory to store code and data for servers. Mobile devices commonly use Flash memory to store code and data for system-on-chip devices. The non-transitory computer readable medium 1120 stores code that, if executed by one or more computers, would cause the computer to perform steps of methods described herein. Other non-moving storage media packaged with leads or solder balls are possible. Any type of computer-readable medium is appropriate for storing code according to various embodiments of the invention.

Figure 12A:
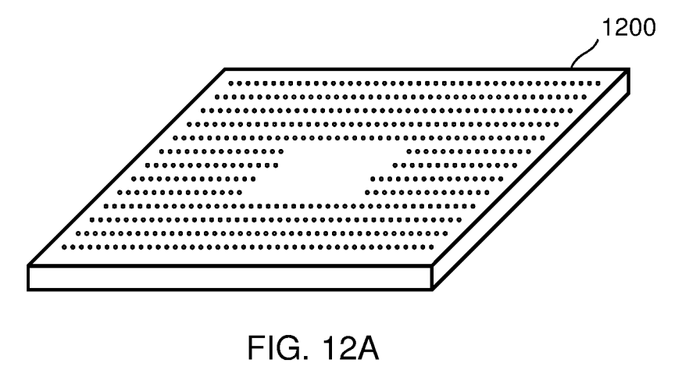
FIG. 12A shows a packaged system-on-chip according to an embodiment of the invention.

Referring now to FIG. 12, the bottom side of a packaged system-on-chip (SoC) device 1200 with a ball grid array for surface-mount soldering to a printed circuit board. Various package shapes and sizes are possible for various chip implementations. SoC devices control many embedded systems and IoT device embodiments as described herein.

Figure 12B:
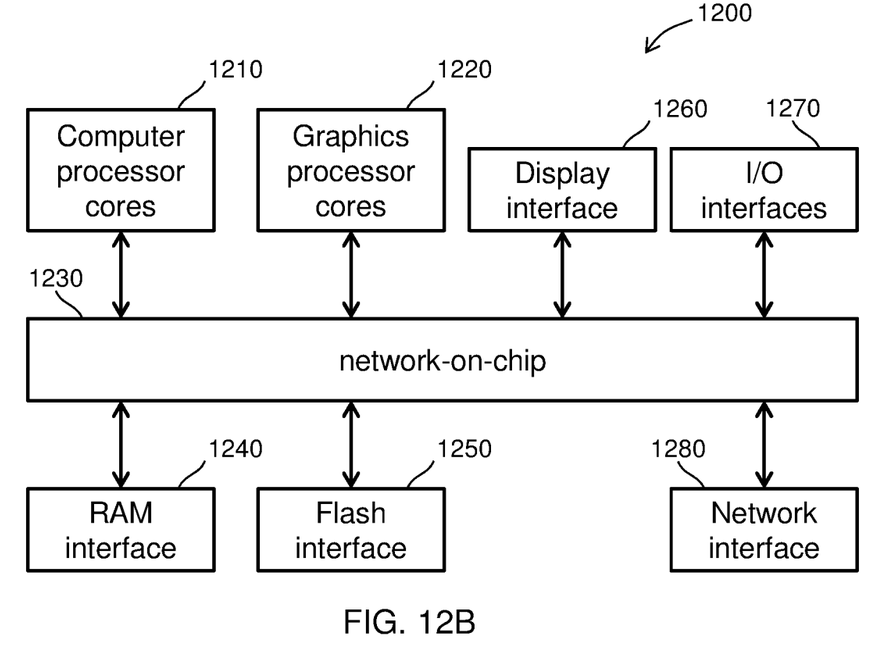
FIG. 12B shows a block diagram of a system-on-chip according to an embodiment of the invention.

Referring now to FIG. 12B, a block diagram of the system-on-chip 1200 of FIG. 12B is shown. The SoC device 1200 comprises a multicore cluster of computer processor (CPU) cores 1210 and a multicore cluster of graphics processor (GPU) cores 1220. The processors 1210 and 1220 connect through a network-on-chip 1230 to an off-chip dynamic random access memory (DRAM) interface 1240 for volatile program and data storage and a Flash interface 1250 for non-volatile storage of computer program code in a Flash RAM non-transitory computer readable medium. The SoC device 1200 also has a display interface 1260 for displaying a GUI and an I/O interface module 1270 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. The SoC device 1200 also comprises a network interface 1280 to allow the processors 1210 and 1220 to access the Internet through wired or wireless connections such as Wi-Fi, 3G, 4G long-term evolution (LTE), 5G, and other wireless interface standard radios as well as ethernet connection hardware. By executing instructions stored in RAM devices through interface 1240 or Flash devices through interface 1250, the CPUs 1210 and GPUs 1220 perform steps of methods as described herein.

Figure 13A:
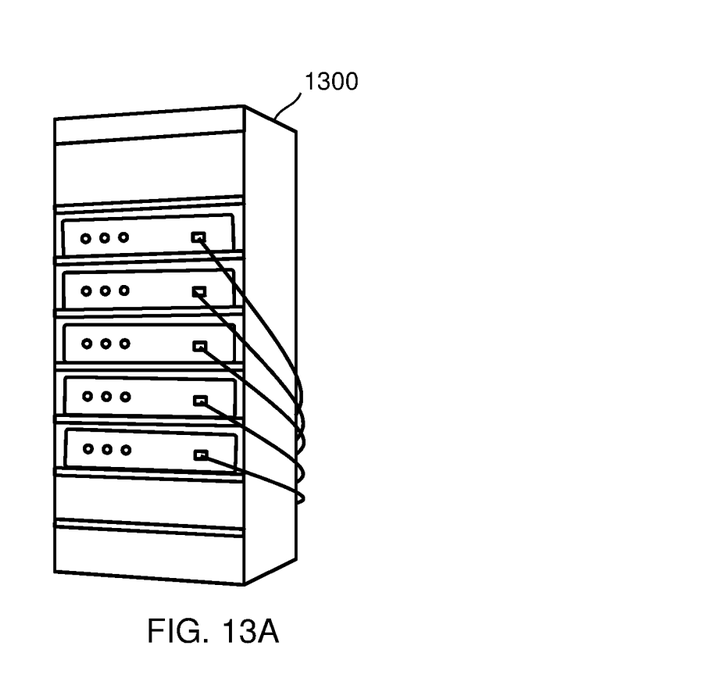
FIG. 13A shows a rack-based server according to an embodiment.

Referring now to FIG. 13A, a rack-mounted server blade multi-processor server system 1300 according to some embodiments is shown. the system 1300 comprises a multiplicity of network-connected computer processors that run software in parallel.

Figure 13B:
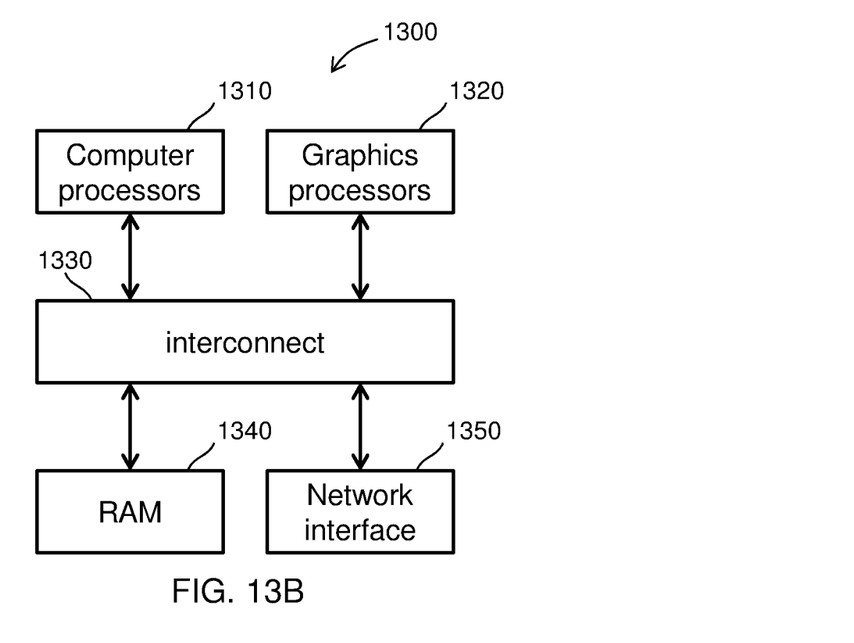
FIG. 13B shows a block diagram of a server according to an embodiment of the invention.

Referring now to FIG. 13B, a block diagram of the server system 1300 of FIG. 13A is shown. The server system 1300 includes a multicore cluster of CPU cores 1310 and a multicore cluster of GPU cores 1320. The processors connect through a board-level interconnect 1330 to random-access memory (RAM) devices 1340 for program code and data storage. Server system 1300 also comprises a network interface 1350 to allow the processors to access the Internet.

By executing instructions stored in RAM device 1340, the CPUs 1310 and GPUs 1320 perform steps of methods as described herein.

Various embodiments are methods that use the behavior of either or a combination of humans and machines. The behavior of either or a combination of humans and machines (instructions that, when executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention. Method embodiments are complete wherever in the world most constituent steps occur. Some embodiments are one or more non-transitory computer readable media arranged to store such instructions for methods described herein. Whatever entity holds non-transitory computer readable media comprising most of the necessary code holds a complete embodiment. Some embodiments are physical devices such as semiconductor chips; hardware description language representations of the logical or functional behavior of such devices; and one or more non-transitory computer readable media arranged to store such hardware description language representations.

Although the invention has been shown and described with respect to a certain preferred embodiment or embodiments, it is obvious that equivalent alterations and modifications will occur to others skilled in the art upon the reading and understanding of this specification and the drawings. Practitioners skilled in the art will recognize many modifications and variations. The modifications and variations include any relevant combination of the disclosed features. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature may have been disclosed with respect to only one of several embodiments, such feature may be combined with one or more other features of the other embodiments as may be desired and advantageous for any given or particular application.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

In accordance with the teachings of the invention, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

An article of manufacture or system, in accordance with an embodiment of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the exemplary embodiments or the various aspects shown and described herein. Rather, the scope and spirit of the present invention is embodied by the appended claims.

What is claimed is:

1. A method comprising:
   searching for a central controller;
   establishing communication with the central controller;
   sending an app-specific function declaration to the central controller;
   receiving a query from the central controller that includes a new grammar; and
   updating a grammar library associated with the app with the new grammar.

2. The method of claim 1 further comprising transferring a grammar to the central controller.

3. The method of claim 1 further comprising transferring an identity of the app to the central controller.

4. The method of claim 1 further comprising:
   sending a device identity to the central controller;
   sending a grammar rule, from a device or a web resource pointed to by the device identity, to the central controller;
   sending audio from a speecrophone to the central controller;
   invoking automatic speech recognition (ASR) and natural language understanding (NLU) services on the audio;
   associating the audio with the device identity and the grammar rule; and
   invoking a function from the function declaration.

5. The method of claim 4 further comprising:
sending a command from the central controller to the device; and
receiving status information from the device.

6. The method of claim 4 further comprising adding the device identity to a list of known device identities.

7. The method of claim 4 further comprising adding the grammar rule to a database of known grammar rules.

8. The method of claim 1 further comprising:
sending a location of an application to the central controller;
sending a device identity to the central controller;
sending a grammar rule for the device identity to the central controller;
sending audio to the central controller;
invoking automatic speech recognition (ASR) and natural language understanding (NLU) services on the audio;
associating the audio with the device identity and the grammar rule; and
invoking a function from the function declaration.

9. A system comprising:
a controller; and
an application in communication with the controller, wherein the application sends an app-specific function declaration to the controller and receives a query from the central controller that includes a new grammar and updated a grammar library, which is associated with the application, with the new grammar.

10. The system of claim 9 further comprising an input means in communication with the controller for receiving commands from a user.

11. The system of claim 9, wherein the application includes an identity.

12. The system of claim 11, wherein the controller receives the identity and the function declaration from the application.

13. The system of claim 11, wherein the controller receives a grammar from at least one of the application and a web resource pointed to by the identity and the controller receives speech audio from a speecrophone.

14. The system of claim 13, wherein the controller processes the speech audio using at least one of automatic speech recognition (ASR) and natural language understanding (NLU) services and associates the speech audio with the identity and the grammar to invoke a function from the function declaration.

15. The system of claim 9 further comprising a speecrophone in communication with the controller, the speecrophone being for sending speech input from a user to the controller and for receiving information from the controller and verbally communicating it to a user.

* * * * *